(12) United States Patent
Murofushi

(10) Patent No.: US 10,944,327 B2
(45) Date of Patent: Mar. 9, 2021

(54) POWER SUPPLY APPARATUS AND IMAGE FORMING APPARATUS

(71) Applicant: CANON KABUSHIKI KAISHA, Tokyo (JP)

(72) Inventor: Mitsuhide Murofushi, Tagata-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/868,879

(22) Filed: May 7, 2020

(65) Prior Publication Data

US 2020/0366210 A1 Nov. 19, 2020

(30) Foreign Application Priority Data

May 16, 2019 (JP) .............................. JP2019-092699

(51) Int. Cl.
*H02M 3/335* (2006.01)
*G03G 15/00* (2006.01)

(52) U.S. Cl.
CPC ........ *H02M 3/33523* (2013.01); *G03G 15/80* (2013.01)

(58) Field of Classification Search
CPC ............. H02M 3/335; H02M 3/33507; H02M 3/33515; H02M 3/33523; H02M 3/33569; H02M 3/33576; G03G 15/80
See application file for complete search history.

(56) References Cited

U.S. PATENT DOCUMENTS

| | | | |
|---|---|---|---|
| 5,285,368 A * | 2/1994 | Ishikawa | G03G 15/0283 363/21.05 |
| 8,085,560 B2 * | 12/2011 | Lee | H02M 3/33553 363/21.15 |
| 8,830,703 B2 | 9/2014 | Murofushi | |
| 10,277,764 B2 | 4/2019 | Kobayashi | |
| 2011/0158674 A1 * | 6/2011 | Inukai | H02M 3/33523 399/88 |
| 2018/0026524 A1 * | 1/2018 | Kasamatsu | H02M 1/36 323/215 |

FOREIGN PATENT DOCUMENTS

JP H08-182315 7/1996
JP 02017041949 * 2/2017 .............. H02M 3/28

* cited by examiner

*Primary Examiner* — Matthew V Nguyen
(74) *Attorney, Agent, or Firm* — Venable LLP

(57) ABSTRACT

The power supply apparatus includes a rectifying and smoothing unit configured to rectify and smooth an AC voltage of an AC power supply, a transformer having a primary winding, first and second secondary windings, a detecting unit connected to the second secondary winding, the detecting unit configured to detect a second voltage according to a voltage output from the rectifying and smoothing unit, and a first control unit configured to control a state of the load based on a result detected by the detecting unit.

14 Claims, 7 Drawing Sheets

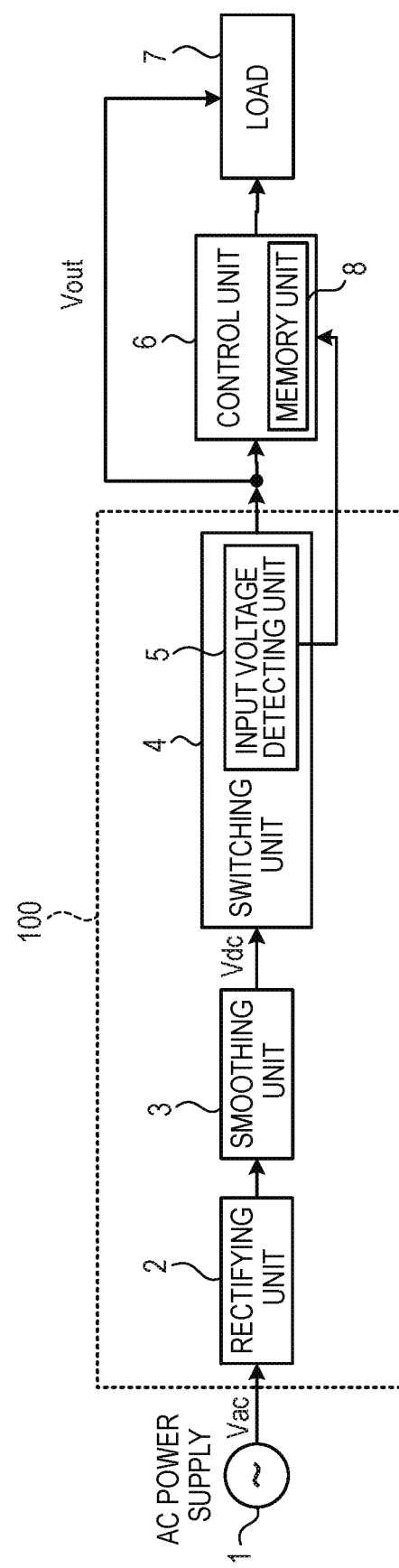

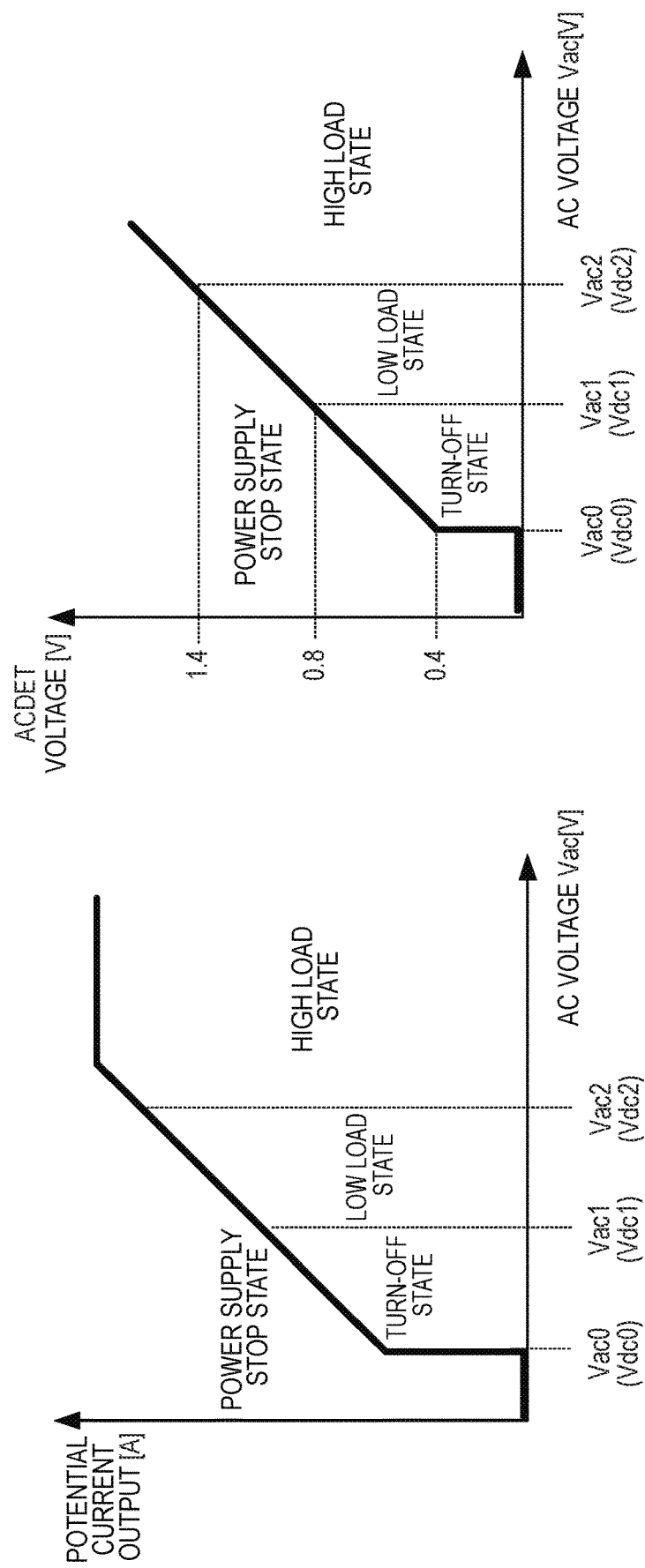

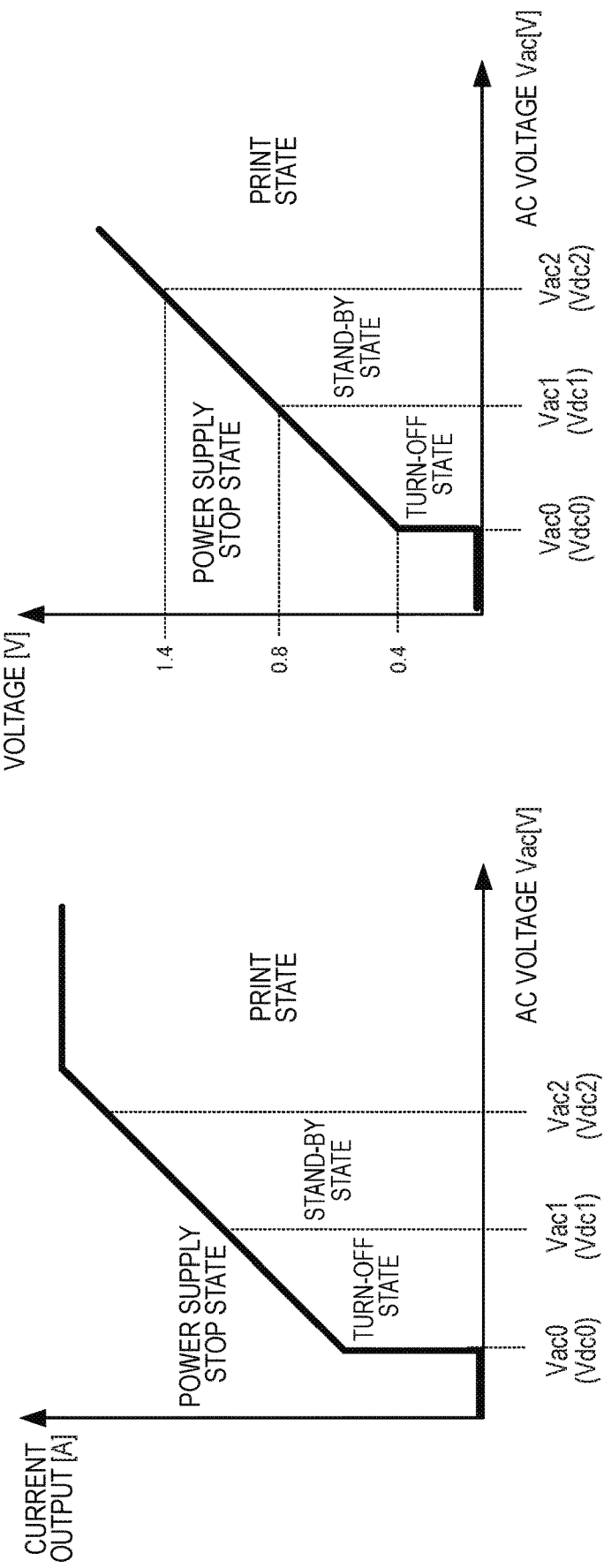

POWER SUPPLY APPARATUS AND IMAGE FORMING APPARATUS

BACKGROUND OF THE INVENTION

Field of the Invention

The present invention relates to a power supply apparatus and an image forming apparatus, and more particularly relates to a power supply apparatus that rectifies and smoothes an AC voltage input from an AC power supply and generates a DC voltage by a switching element and a transformer.

Description of the Related Art

Some power supply apparatuses and image forming apparatuses are configured to support a power supply turn-off state in which power consumption is extremely small while receiving a supply of power from an AC power supply, a stand-by state which corresponds to a low load during standby operation, and a high load operating state in which the power consumption is greater than in the stand-by state. In addition, a configuration is also available that controls the operation of a power supply apparatus by rectifying and smoothing an input voltage from an AC power supply and detecting the voltage, and providing a monitoring control circuit that monitors an input voltage using an optical semiconductor (see Japanese Patent Application Laid-Open No. H08-182315).

However, because power is consumed when a voltage that was rectified and smoothed is detected and a light emitting device of an optical semiconductor is driven, it has conventionally been difficult to achieve power savings. Further, in a case where operation of a power supply is stopped to protect the power supply in a state in which the input voltage is low, shifting to a low load state in which operation is enabled even in a state in which the input voltage is low cannot be performed, and the power supply to a load which consumes power connected to the power supply apparatus is cut off.

SUMMARY OF THE INVENTION

An aspect of the present invention is a power supply apparatus including a rectifying and smoothing unit configured to rectify and smooth an AC voltage of an AC power supply, a transformer having a primary winding, a first secondary winding and a second secondary winding, the transformer configured to convert a voltage output from the rectifying and smoothing unit to output a first voltage to be supplied to a load, a detecting unit connected to the second secondary winding, the detecting unit configured to detect a second voltage according to a voltage output from the rectifying and smoothing unit, and a first control unit configured to control a state of the load based on a result detected by the detecting unit.

Another aspect of the present invention is an image forming apparatus configured to form an image on a recording medium, the image forming apparatus having a power supply apparatus configured to supply power to the image forming apparatus, the power supply apparatus including a rectifying and smoothing unit configured to rectify and smooth an AC voltage of an AC power supply, a transformer having a primary winding, a first secondary winding and a second secondary winding, the transformer configured to convert a voltage output from the rectifying and smoothing unit to output a first voltage to be supplied to a load, a detecting unit connected to the second secondary winding, the detecting unit configured to detect a second voltage according to a voltage output from the rectifying and smoothing unit, and a first control unit configured to control a state of the load based on a result detected by the detecting unit.

Further features of the present invention will become apparent from the following description of exemplary embodiments with reference to the attached drawings.

BRIEF DESCRIPTION OF THE DRAWINGS

FIG. 1 is a block diagram of a power supply apparatus of Embodiment 1.

FIG. 3A and FIG. 3B are graphs illustrating a relation between an AC voltage and a potential current output and a load state in Embodiment 1.

FIG. 6A and FIG. 6B are graphs illustrating the relation between an AC voltage and a potential current output and the state of the image forming apparatus in Embodiment 2.

DESCRIPTION OF THE EMBODIMENTS

Figure 2A:
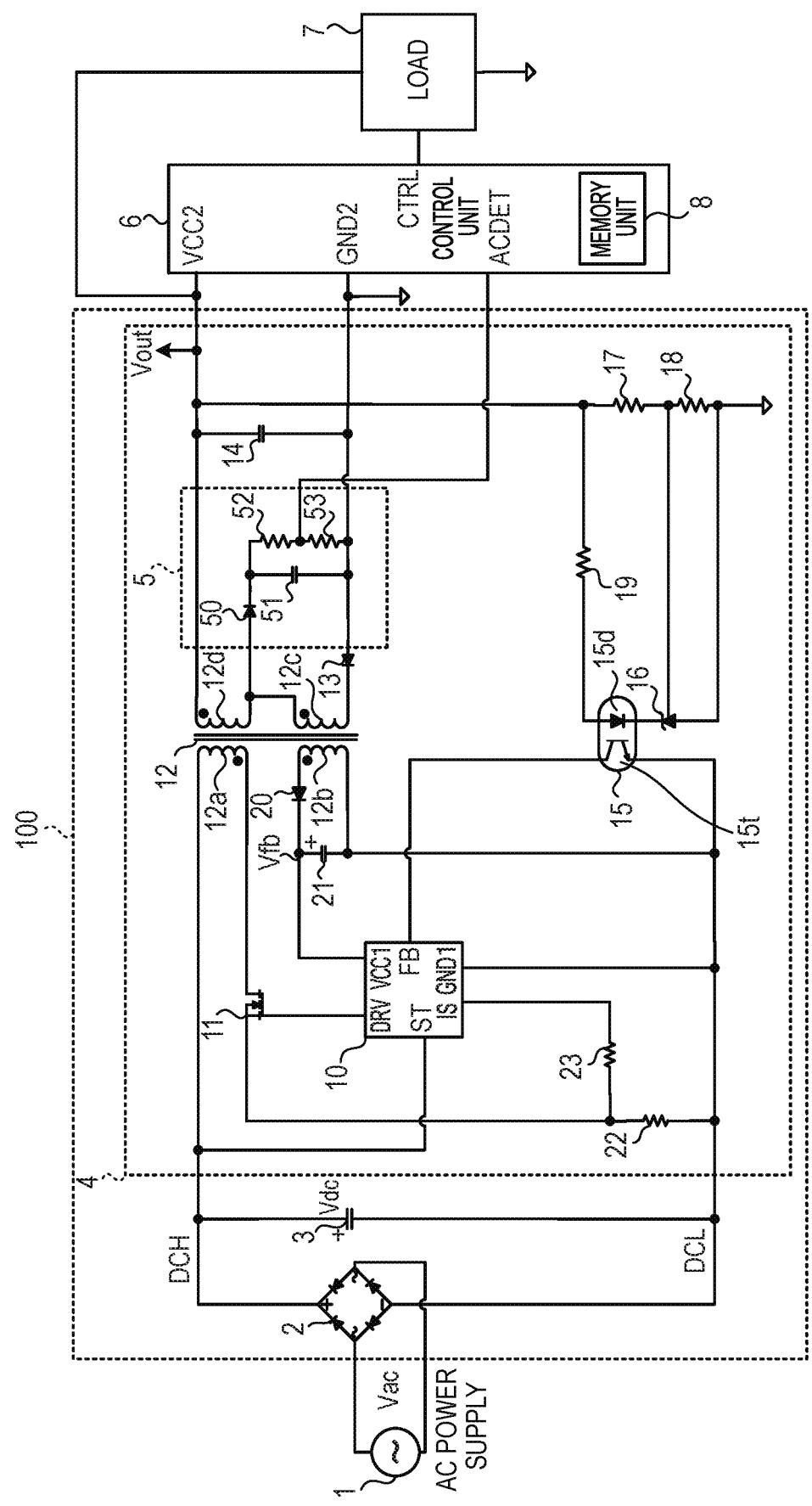
FIG. 2A is a circuit diagram of the power supply apparatus of Embodiment 1.

Preferred embodiments of the present invention will now be described in detail in accordance with the accompanying drawings.

[Power Supply Apparatus]

FIG. 1 is a block diagram of a power supply apparatus 100 of Embodiment 1. An AC power supply 1 is a power supply configured to supply an AC voltage Vac. A rectifying unit 2 has a bridge diode that rectifies the AC voltage Vac. A smoothing unit 3 smoothes the voltage that was rectified by the rectifying unit 2, and outputs a voltage Vdc. The rectifying unit 2 and the smoothing unit 3 constitute one example of a rectifying and smoothing unit. A switching unit 4 is one example of an output unit, and is configured to convert the voltage Vdc output from the smoothing unit 3 to an output voltage Vout (first voltage) that is a DC voltage by a switching operation. The input voltage detecting unit 5 is one example of an input voltage detecting unit, and is configured to detect the voltage Vdc of the smoothing unit 3 input to the switching unit 4, and output a detection signal that is a detection result.

A control unit 6 receives the output voltage Vout output from the switching unit 4, and the detection signal output from the input voltage detecting unit 5. The control unit 6 controls a load 7 that consumes power upon the output voltage Vout being input thereto. The control unit 6 is a CPU (central processing unit) that controls operations of the load 7. The control unit 6 has a configuration in which a ROM (read only memory) that holds operating procedures and data, and a RAM (random access memory) that temporarily holds information are integrated, and may be a one-chip microcomputer, for example. Examples of the load 7 into which the output voltage Vout of the power supply apparatus 100 is input may include an information processing apparatus (not illustrated) such as a computer, or an image input/output apparatus such as an image scanner or printer, and the load 7 is assumed to be a unit that consumes power. A memory unit 8 is, for example, a rewritable non-volatile memory EEPROM (electrically erasable programmable read only memory). The memory unit 8 is a memory unit that stores information required for operations of the control unit 6. Further, the memory unit 8 is disposed inside the control unit 6 as illustrated in FIG. 1, and may be one part of a one-chip microcomputer.

In a case where the AC voltage Vac is low and the voltage Vdc that was rectified and smoothed is low, a limit arises with regard to the power that can be supplied to the load 7, and depending on the power consumption of the load 7, in some cases the power supply apparatus 100 cannot supply the power. For example, in some cases, by detecting an overcurrent or an overload by a protection circuit (not illustrated), the output voltage Vout is lowered or the power supply apparatus 100 is stopped and the power supply is stopped in order to protect the power supply apparatus 100.

[Circuit Structure of Power Supply Apparatus]

FIG. 2A is a view illustrating in detail the power supply apparatus 100 illustrated in FIG. 1, and is a view for describing a circuit of the power supply apparatus 100, the control unit 6, the load 7 and the memory unit 8. In FIG. 2A, like elements that correspond to elements described above with respect to FIG. 1 are denoted by the same reference numerals as in FIG. 1. Here, the higher voltage of the smoothing unit 3 is referred to as "DCH", and the lower voltage is referred to as "DCL". A switching control IC 10 that is a second control unit of the switching unit 4 is an IC that controls switching operations. A switching element 11 such as a MOSFET (metal oxide semiconductor field effect transistor) repeats a switching operation that is conduction/non-conduction operation in which the switching element 11 is switched on and off. The switching control IC 10 outputs a DRV signal to a gate terminal of the switching element 11 to control the switching element 11.

A switching transformer 12 is one example of a transformer. The transformer 12 has a main winding 12a (primary winding), an auxiliary winding 12b, an output winding 12c (second secondary winding) and an output winding 12d (first secondary winding). The transformer 12 applies a voltage Vdc of a smoothing capacitor (hereunder, referred to as "smoothing capacitor 3") constituting the smoothing unit 3 generated by conduction/non-conduction operation of the switching element 11 to the main winding 12a, and outputs a voltage proportional to the number of turns of the auxiliary winding 12b and the output windings 12c and 12d. A diode 13 rectifies the output voltage from the output winding 12c and the output winding 12d, and the rectified voltage is smoothed by a capacitor 14 and output as an output voltage Vout.

A photocoupler 15 feeds back the state of the output voltage Vout from the output winding 12c and the output winding 12d to the switching control IC 10. The photocoupler 15 is constituted by a light emitting diode 15d and a light receiving transistor 15t. The state of the output voltage Vout is fed back as an FB signal to the switching control IC 10 via the photocoupler 15 while the current is being limited by a resistance 19 so as to be a predetermined voltage by a regulator 16 and a divided voltage of resistances 17 and 18. The switching control IC 10 controls conduction/non-conduction operation of the switching element 11 according to the FB signal that was input. The resistances 17 and 18, the regulator 16 and the photocoupler 15 function as a feedback unit.

A capacitor 21 is connected via a diode 20 to the auxiliary winding 12b. A flyback output voltage Vfb output after the switching element 11 is switched on and the voltage Vdc is applied to the main winding 12a is fed to the capacitor 21 for storage. The capacitor 21 is connected to VCC1 of the switching control IC 10. The capacitor 21 supplies the operating power of the switching control IC 10. Resistances 22 and 23 are resistances that detect the current of the main winding 12a during switching by the switching element 11. The switching control IC 10 detects the current of the main winding 12a during switching via the resistance 23 as an IS signal, and controls switching operations of the switching element 11 together with an FB signal. The switching control IC 10 compares an internal current detection threshold voltage (not illustrated) and the IS signal. When the voltage of the IS signal is lower than the current detection threshold voltage, the switching control IC 10 continues the switched-on state of the switching element 11, and upon the voltage of the IS signal reaching the threshold voltage, the switching control IC 10 performs control to switch off the switching element 11 in a non-conducting state. Note that, GND1 of the switching control IC 10 is connected to the DCL.

The output voltage Vout is input to VCC2 of the control unit 6 to thereby supply the operating power of the control unit 6. When starting a switching operation, operating power is input to the switching control IC 10 via an ST terminal connected to the smoothing capacitor 3 (DCH). Accompanying a rise in the voltage Vdc of the smoothing capacitor 3, the switching control IC 10 starts to operate, and the switching control IC 10 stops or operates according to the voltage Vdc of the smoothing capacitor 3. Note that, GND2 of the control unit 6 is grounded.

In the input voltage detecting unit 5 that is a detecting unit, the output voltage Vout of the capacitor 14 input via a diode 50 and a forward output voltage from the output winding 12d are smoothed by a capacitor 51. The voltage of the capacitor 51 is a voltage in which a voltage proportional to the voltage Vdc of the smoothing capacitor 3 applied to the main winding 12a and the output voltage Vout are superimposed, and a voltage that was divided at a resistance 52 and a resistance 53 is input to an ACDET terminal of the control unit 6. The control unit 6 acquires voltage data by performing analog-digital conversion (hereunder, referred to as "A/D conversion") on to the voltage input to the ACDET terminal (hereunder, referred to as "ACDET voltage"). That is, the input voltage detecting unit 5 outputs the ACDET voltage that is a second voltage to the control unit 6, and the control unit 6 detects the input voltage based on the ACDET voltage. Hereunder, the voltage that was subjected to A/D conversion by the control unit 6 is also referred to as "ACDET voltage".

The load 7 is connected so that the output voltage Vout of the power supply apparatus 100 is input thereto, and is controlled by a signal (hereunder, referred to as "CTRL signal") output from a CTRL terminal of the control unit 6. For example, if the CTRL signal is in a Low state, the load 7 enters a turn-off state in which the output voltage Vout is input and power consumption is extremely small. On the other hand, if the CTRL signal is in a state in which a High state and a Low state are alternately repeated, the load 7 enters a low load state in which power consumption is small. If the CTRL signal is in a High state, the load 7 enters a high load state in which the output voltage Vout is input and the load 7 consumes power. In this way, the state of the load 7 shifts according to the CTRL signal.

[Modification]

Figure 2B:
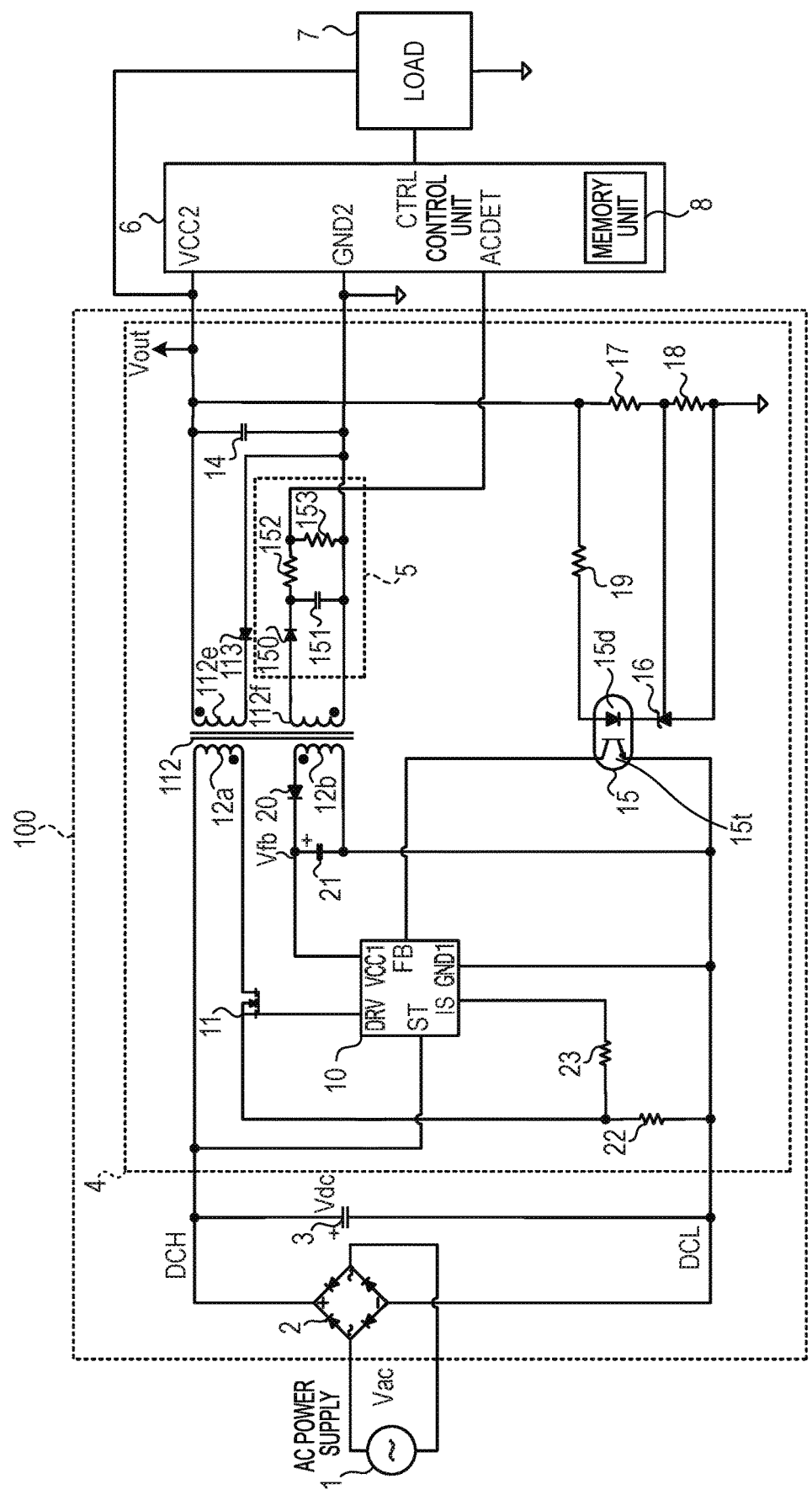
FIG. 2B is a circuit diagram of a power supply apparatus of a modification of Embodiment 1.

FIG. 2B is a view illustrating another configuration with respect to the input voltage detecting unit 5 illustrated in FIG. 2A. A transformer 112 has the main winding 12a (primary winding), the auxiliary winding 12b, an output winding 112e (first secondary winding) and an output winding 112f (second secondary winding). The configurations and connections of the main winding 12a (primary winding) and the auxiliary winding 12b are the same as in the transformer 12 illustrated in FIG. 2A.

The transformer 112 applies a voltage Vdc of a smoothing capacitor constituting the smoothing unit 3 generated by conduction/non-conduction operation of the switching element 11 to the main winding 12a, to thereby output voltages proportional to the number of turns of the auxiliary winding 12b and the output windings 12e and 12f. A diode 113 rectifies the output voltage from the output winding 12e. The rectified voltage is smoothed by the capacitor 14 and is output as an output voltage Vout.

A forward output voltage from the output winding 112f is smoothed by a capacitor 151 via a diode 150. The voltage of the capacitor 151 is a voltage proportional to the voltage Vdc of the smoothing capacitor 3 applied to the main winding 12a, and a voltage that was divided by a resistance 152 and a resistance 153 is input to the ACDET terminal of the control unit 6. The control unit 6 detects the input voltage based on the ACDET voltage as illustrated in FIG. 2A.

[Relation Between AC Voltage and Potential Current Output or ACDET Voltage]

FIG. 3A is a graph illustrating the relation between the AC voltage Vac and the potential current output of the power supply apparatus 100 in correspondence to the voltage Vdc of the smoothing capacitor 3. In FIG. 3A, the AC voltage Vac [V] is shown on the abscissa axis, and the current that can be output (potential current output) [A] is shown on the ordinate axis. In FIG. 3A, a power supply stop state that is a first state in which the power supply apparatus 100 is stopped, and a turn-off state that is a second state in which the load 7 is stopped in a low power consumption state are illustrated. In addition, a low load state that is a third state in which the load 7 consumes more power than in the turn-off state, and a high load state that is a fourth state in which the load 7 consumes more power than in the low load state are also illustrated in FIG. 3A.

In a region (0≤Vac≤Vac0) from 0 to Vac0 (=Vdc0) that is a first threshold voltage which is a region in which the AC voltage Vac is low, the power supply apparatus 100 is in a stopped state. When the AC voltage Vac becomes equal to or greater than Vac0, the power supply apparatus 100 is actuated and starts a switching operation and generates an output voltage Vout. However, the state in this region (Vac0≤Vac<Vac1) is a turn-off state in which the load 7 is stopped. When the AC voltage Vac becomes equal to or greater than Vac1 (=Vdc1) that is a second threshold voltage, a state is entered in which power can be supplied from the power supply apparatus 100 until the load 7 enters the low load state. It is illustrated in FIG. 3A that in this region (Vac1≤Vac<Vac2) the control unit 6 can sift the state of the load 7 to the low load state by controlling the load 7. When the AC voltage Vac becomes equal to or greater than Vac2 (=Vdc2) that is a third threshold voltage, a state is entered in which power can be supplied from the power supply apparatus 100 until the load 7 enters the high load state. It is illustrated in FIG. 3A that in this region (Vac2 Vac), the control unit 6 can shift the state of the load 7 to the high load state by controlling the load 7.

FIG. 3B is a graph illustrating the relation between the AC voltage Vac and the ACDET voltage, and also shows the state of the load 7. In FIG. 3B, the AC voltage Vac [V] is shown on the abscissa axis, and the ACDET voltage [V] output from the input voltage detecting unit 5 is shown on the ordinate axis. For example, a first threshold voltage Vac0 for shifting from the power supply stop state to the turn-off state in which the power supply apparatus 100 starts up and the load 7 is stopped corresponds to an ACDET voltage of 0.4 V. Further, a second threshold voltage Vac1 that separates the region of the turn-off state and the region of the low load state corresponds to an ACDET voltage of 0.8 V. In addition, a third threshold voltage Vac2 that separates the region of the low load state and the region of the high load state corresponds to an ACDET voltage of 1.4 V. Thus, the ACDET voltage changes according to the AC voltage Vac, and by detecting the ACDET voltage, the control unit 6 indirectly detects the AC voltage Vac so that the control unit 6 can determine a state to which the load 7 can shift.

Information in which the ACDET voltage and the AC voltage Vac or the voltage Vdc of the smoothing capacitor 3 are associated is stored in advance in the memory unit 8. Based on the ACDET voltage that is input and the information stored in the memory unit 8, the control unit 6 acquires the AC voltage Vac or the voltage Vdc corresponding to the ACDET voltage that is input. Based on the acquired AC voltage Vac or voltage Vdc, the control unit 6 determines a state to which a state of the load 7 is to be sifted. Further, it is assumed that the values of Vac0 (Vdc0), Vac1 (Vdc1) and Vac2 (Vdc2) that are thresholds of voltages for shifting to the respective states are also stored in the memory unit 8.

[Load State Shift Processing]

Figure 4:
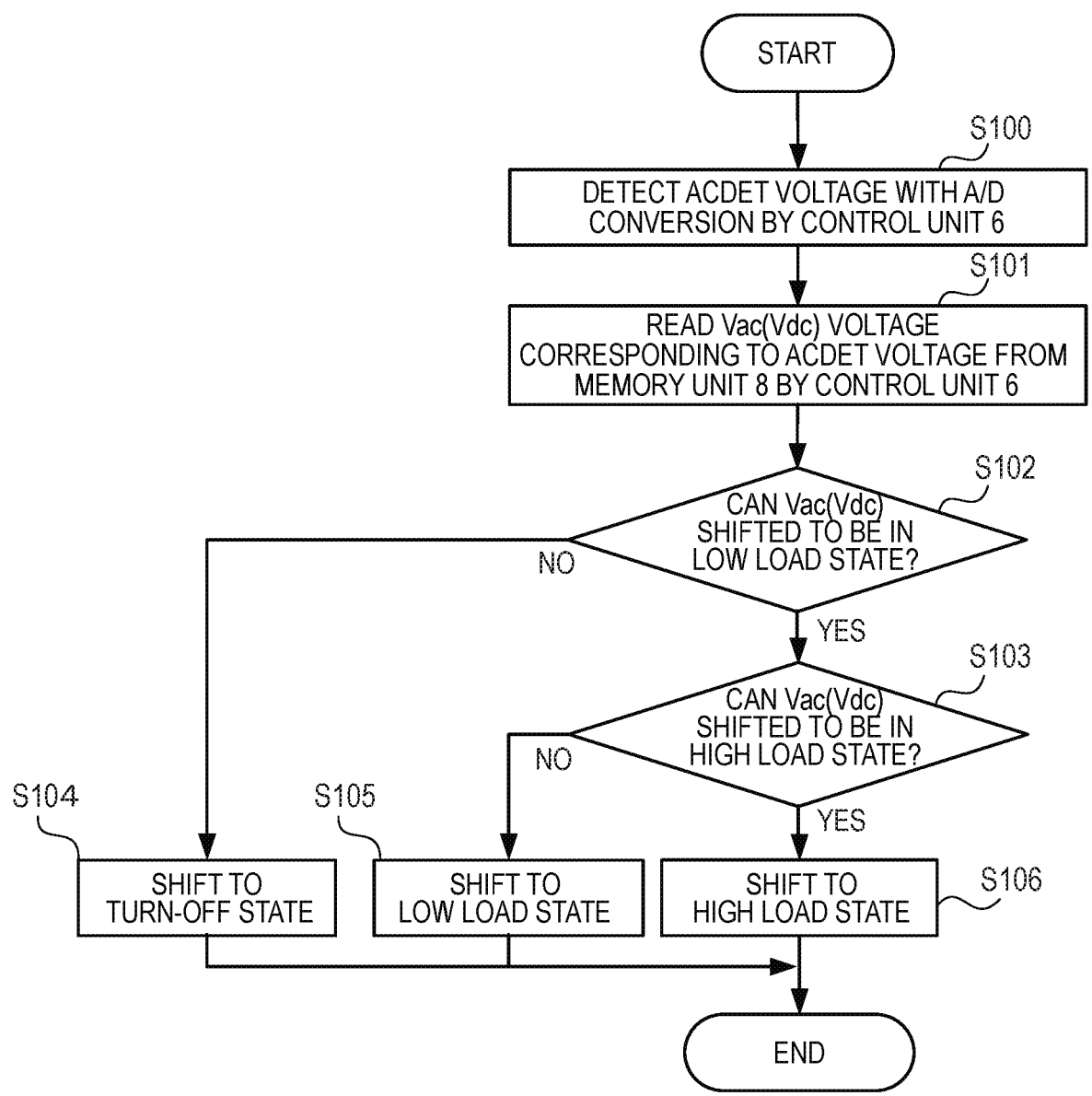
FIG. 4 is a flowchart illustrating control processing of the power supply apparatus of Embodiment 1.

FIG. 4 is a flowchart of processing through which the control unit 6 that is a first control unit subjects the ACDET voltage to A/D conversion to acquire voltage data, and performs a determination for shifting the state of the load 7 according to the voltage Vdc or the AC voltage Vac read from the memory unit 8. In step (hereunder, abbreviated as "S") 100, the control unit 6 subjects the ACDET voltage input from the input voltage detecting unit 5 to A/D conversion and detects the voltage. In S101, the control unit 6 reads the voltage Vdc of the smoothing capacitor 3 corresponding to the ACDET voltage or reads the corresponding AC voltage Vac, from the information stored in the memory unit 8.

In S102, the control unit 6 determines whether or not the load 7 can be shifted to the low load state based on the AC voltage Vac (or the voltage Vdc) that was read in S101. Specifically, as described above with respect to FIG. 3A and FIG. 3B, the control unit 6 determines whether or not the AC voltage Vac (or the voltage Vdc) is equal to or greater than Vac1 (or Vdc1). If the control unit 6 determines in S102 that the load 7 can be shifted to the low load state, that is, that the AC voltage Vac (or the voltage Vdc) is equal to or greater than Vac1 (or Vdc1), the control unit 6 advances the processing to S103. If the control unit 6 determines that the load 7 cannot be shifted to the low load state, that is, that the AC voltage Vac (or the voltage Vdc) is less than Vac1 (or Vdc1) (less than the second threshold voltage), the control unit 6 advances the processing to S104. In S104, the control unit 6 shifts the load 7 to the turn-off state, and ends the processing.

In S103, the control unit 6 determines whether or not the load 7 can be shifted to the high load state, based on the AC voltage Vac (or the voltage Vdc) that was read in S101. Specifically, as described above with respect to FIG. 3A and FIG. 3B, the control unit 6 determines whether or not the AC voltage Vac (or the voltage Vdc) is equal to or greater than Vac2 (or Vdc2). If the control unit 6 determines in S103 that the load 7 can be shifted to the high load state, that is, that the AC voltage Vac (or the voltage Vdc) is equal to or greater than Vac2 (or Vdc2), the control unit 6 advances the processing to S106. If the control unit 6 determines that the load 7 cannot be shifted to the high load state, that is, that the AC voltage Vac (or the voltage Vdc) is less than Vac2 (or Vdc2), the control unit 6 advances the processing to S105. In S105, the control unit 6 shifts the state of the load 7 to the low load state, and ends the processing. In S106, the control unit 6 shifts the state of the load 7 to the high load state, and ends the processing. In a state in which the power supply apparatus 100 is operating, the above processing of S100 to S106 is repeatedly executed by the control unit 6.

[Information Stored in Memory Unit]

Table 1 lists the contents of data stored in the memory unit 8, in table format.

TABLE 1

| ACDET Voltage [V] | Vac Voltage [V] | (Vdc Voltage [V]) | Shift Option State | Vac*(Vdc*) |
|---|---|---|---|---|
| 0.4 or more | 30 or more | 40 or more | Turn-off State | Vac0(Vdc0) |
| 0.8 or more | 60 or more | 80 or more | Low Load State | Vac1(Vdc1) |
| 1.4 or more | 100 or more | 140 or more | High Load State | Vac2(Vdc2) |

Table 1 shows the ACDET voltage [V] in a first column, the Vac voltage [V] in a second column, the Vdc voltage [V] in a third column, the shift option state in a fourth column, and the threshold voltages Vac* (Vdc*) when shifting to the next state in a fifth column. Any one of 0, 1, and 2 correspond to "*". For example, when the ACDET voltage is 0.8 V or more, the AC voltage Vac is 60 V or more, the voltage Vdc is 80 V or more, and the state is one in which the load 7 can be shifted to the low load state. The threshold for state-shift (more specifically, shift from the turn-off state to the low load state) in this case is Vac1 (or Vdc1).

Table 1 is a table which the control unit 6 refers to in S101 of FIG. 4 when reading the voltage Vdc of the smoothing capacitor 3 corresponding to the ACDET voltage or the corresponding AC voltage Vac from the memory unit 8. Table 1 shows that when the ACDET voltage is in the range of $0.4 \leq \text{ACDET} < 0.8$ V, the state to which the load 7 can be shifted is the turn-off state, and when the ACDET voltage is in the range of $0.8 \leq \text{ACDET} < 1.4$ V, the state of the load 7 can be shifted to the low load state. Further, Table 1 shows that when the ACDET voltage is in a value such that 1.4 V ACDET, the load 7 can be shifted to the high load state.

As described above in Embodiment 1, by detecting the ACDET voltage with respect to the voltage Vdc that corresponds to the AC voltage Vac that is the input voltage, the control unit 6 can indirectly detect the AC voltage Vac with a configuration in which there is little power loss. By the control unit 6 determining whether the load 7 can be shifted to the low load state or the high load state according to the AC voltage Vac that corresponds to the voltage Vdc when the power supply apparatus 100 supplies power to the load 7, power can be stably supplied to the load 7.

Thus, according to Embodiment 1, while achieve power savings, the power supply apparatus can operate stably in various states according to the input voltage from the AC power supply, and stable power supply to the load can be performed.

[Configuration of Image Forming Apparatus]

Figure 5:
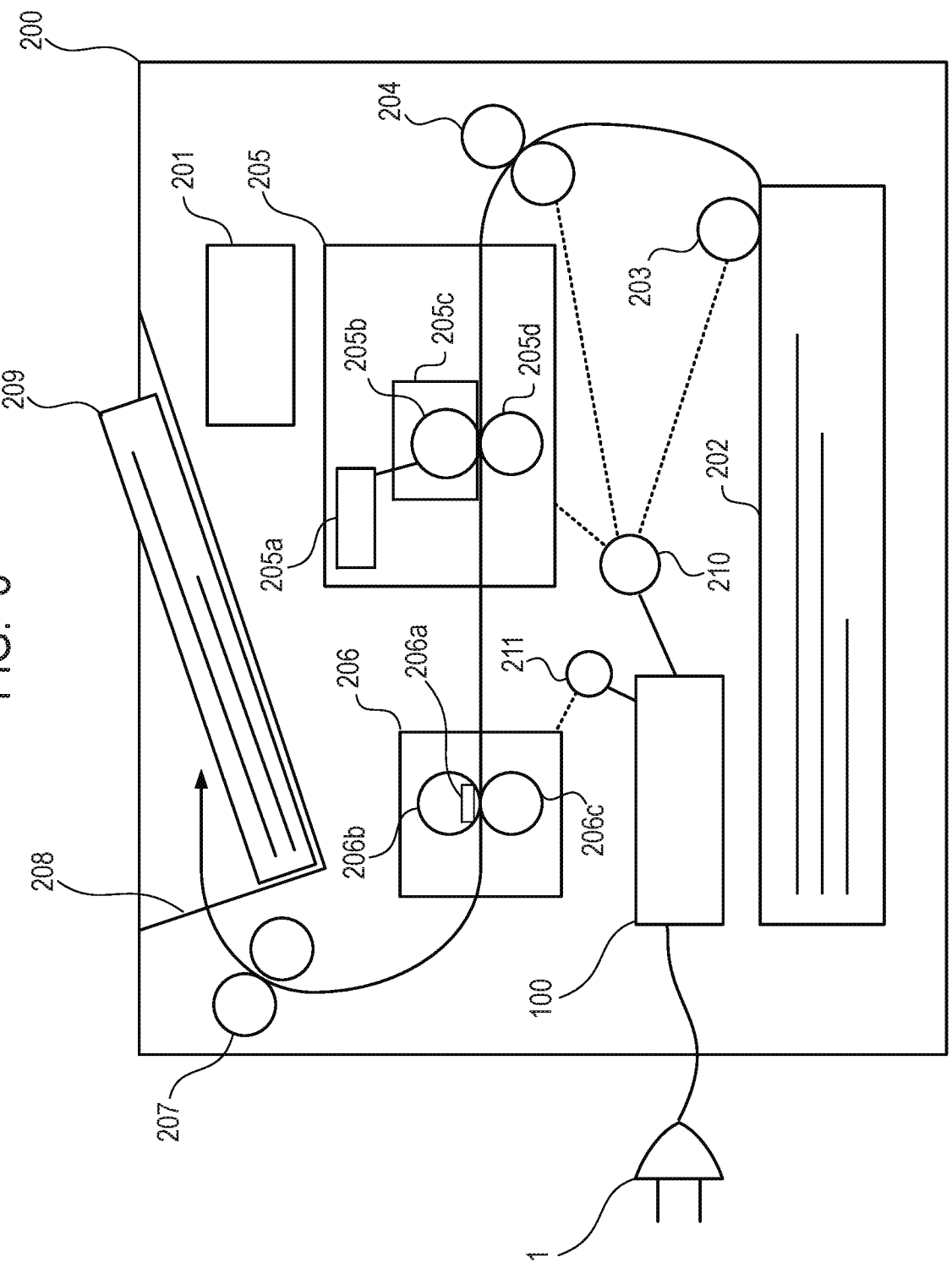
FIG. 5 is a schematic diagram illustrating an image forming apparatus of Embodiment 2.

The power supply apparatus 100 described in Embodiment 1 can be applied to a power supply in an image forming apparatus such as a laser beam printer. FIG. 5 is a cross-sectional view and a block diagram of an image forming apparatus 200 of Embodiment 2. An image formation control unit 201 is a control unit that controls the image forming apparatus 200, and for example is a CPU (central processing unit). The image formation control unit 201 is a unit in which a ROM that holds data and procedures for controlling operations and a RAM that temporarily holds information are integrated, or is a unit in which circuits that individually have equivalent functions thereto are connected. A recording medium 202 is a recording medium that records an image, and for example is a medium composed of paper or the like that records and holds an image. A pick-up roller 203 is a roller that feeds out the recording medium 202. Registration rollers 204 are rollers that align the leading edge of the recording medium 202.

An image forming unit 205 is one example of an image forming unit, and is configured to form an image by a known electrophotographic process on the recording medium 202 that was conveyed thereto. An irradiating unit 205a irradiates a latent image of an image onto a photosensitive drum 205b during the electrophotographic process. A developing unit 205c forms the latent image formed on the photosensitive drum 205b, as a toner image. A transfer member 205d transfers the toner image formed on the photosensitive drum 205b onto the recording medium 202.

A fixing unit 206 is one example of an image heating unit, and is configured to stabilize and fix an unfixed toner image formed on the recording medium 202. A heating member 206a is a member to which power is supplied from the AC power supply 1 and which generates heat. A film member 206b transmits heat of the heating member 206a to the recording medium 202. A pressurizing member 206c applies pressure to the recording medium 202 and the toner image together with the application of heat transmitted from the heating member 206a by the film member 206b. A discharge roller 207 discharges the recording medium 202 to an upper part of the image forming apparatus 200. A discharge tray 208 holds the discharged recording medium 202. Reference numeral 209 denotes a state in which a plurality of the recording media 202 that underwent image formation and fixing have been discharged and stacked on the discharge tray 208. The foregoing is a description of image forming operations performed by the image forming apparatus 200. Note that, the image formation control unit 201 may have the functions of the control unit 6 of the power supply apparatus 100.

A motor 210 drives the pick-up roller 203, the registration rollers 204, and the image forming unit 205 that convey the recording medium 202. A motor 211 drives the fixing unit 206. The motors 210 and 211 consume power output from the power supply apparatus 100. Note that, the pick-up roller 203, the registration rollers 204, the discharge roller 207 and the motors 210 and 211 represent an example of components constituting a conveyance unit for the recording medium 202. In the image forming apparatus 200, the operating state shifts among a stop state of the power supply apparatus 100 that is a first state, a turn-off state that is a second state, a stand-by state that is a third state, and a print state that is a fourth state.

[Relation Between AC Voltage and Output Current or ACDET Voltage]

FIG. 6A is a graph illustrating the relation between the AC voltage Vac and the potential current output of the power supply apparatus 100 corresponding to the voltage Vdc of the smoothing capacitor 3, and is a similar graph to the graph illustrated in FIG. 3A. A power supply stop state in which the power supply apparatus 100 of the image forming apparatus 200 is stopped, and a turn-off state in which the power supply apparatus 100 is operating but the image forming apparatus 200 is stopped are illustrated together in FIG. 6A. In addition, a stand-by state in which the image forming apparatus 200 is operating but is waiting for print data, and a print state in which the image forming apparatus 200 is operating and performing printing are also illustrated in FIG. 6A. That is, the image forming apparatus 200 of Embodiment 2 corresponds to the load 7 of Embodiment 1.

As illustrated in FIG. 6A, in a state where the AC voltage Vac is a low voltage Vac0 (=Vdc0), the power supply apparatus 100 is in a stopped state and the image forming apparatus 200 is also in a stopped state. When the AC voltage Vac becomes Vac0 or greater, although the power supply apparatus 100 starts up and begins a switching operation and generates the output voltage Vout, the image forming apparatus 200 is stopped and is in the turn-off state that is a low power consumption state. When the AC voltage Vac becomes Vac1 (=Vdc1) or greater, a state is entered in which the power supply apparatus 100 can supply power so that the image forming apparatus 200 enters the stand-by state, and the image forming apparatus 200 can shift to the stand-by state. When the AC voltage Vac becomes Vac2 (=Vdc2) or greater, a state is entered in which the power supply apparatus 100 can supply the power required by the image forming apparatus 200 in the print state, and the image forming apparatus 200 can shift to the print state.

Further, FIG. 6B is a graph illustrating the relation between the AC voltage Vac and the ACDET voltage, which is a similar graph to the graph in FIG. 3B. The state of the image forming apparatus 200 is also illustrated in FIG. 6B. The ACDET voltage changes according to the AC voltage Vac, and the control unit 6 can indirectly detect the AC voltage Vac and determine the state to which the image forming apparatus 200 can shift.

[Information Stored in Memory Unit]

Table 2 lists the contents of information stored in the memory unit 8 in table format, and is a similar table to Table 1. Table 2 shows that when the ACDET voltage is in the range of 0.4 V≤ACDET<0.8 V, the state to which the image forming apparatus 200 can be shifted is the turn-off state, and when the ACDET voltage is in the range of 0.8 V≤ACDET<1.4 V, the image forming apparatus 200 can shift to the stand-by state. Further, Table 2 shows that when the ACDET voltage is a value such that 1.4 V ACDET, the image forming apparatus 200 can shift to the print state and the image forming apparatus 200 can print according to print data.

The image forming apparatus 200 such as a laser beam printer shifts its state to a power supply stop state in which the power supply apparatus 100 is stopped, and to a turn-off state that is a low power consumption state in which the power supply apparatus 100 is operating but the image forming apparatus 200 is stopped. In addition, the image forming apparatus 200 shifts it state to a stand-by state in which the image forming apparatus 200 is operating and is standing by and waiting for print data, and a print state in which the image forming apparatus 200 is operating and is printing an image on the recording medium 202. The state shift processing in a case where the power supply apparatus 100 is mounted in the image forming apparatus 200 is the same as the processing described referring to FIG. 4. Note that, in this case, the phrase "low load state" in S102 and S105 of FIG. 4 is replaced with the phrase "stand-by state", and the phrase "high load state" in S103 and S106 of FIG. 4 is replaced with the phrase "print state".

For example, as described in Embodiment 1, with respect to the voltage Vdc that corresponds to the AC voltage Vac that is the input voltage, the control unit 6 detects the output voltage of the transformer 12 as the ACDET voltage that was divided by the resistances in the input voltage detecting unit 5. By this means, the control unit 6 can indirectly detect the AC voltage Vac with a configuration in which there is little power loss. By the control unit 6 determining whether the image forming apparatus 200 can be shifted to the stand-by state or the print state when the power supply apparatus 100 supplies power to the image forming apparatus 200 according to the AC voltage Vac, power can be stably supplied to the image forming apparatus 200.

Thus, according to Embodiment 2, while achieving power savings, the power supply apparatus can operate stably in various states according to the input voltage from the AC power supply, and stable power supply to the load can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-092699, filed May 16, 2019, which is hereby incorporated by reference herein in its entirety.

What is claimed is:

1. A power supply apparatus comprising:
a rectifying and smoothing unit configured to rectify and smooth an AC voltage of an AC power supply;
a transformer having a primary winding, a first secondary winding and a second secondary winding connected to the first secondary winding through a signal line, the transformer configured to convert a voltage output from the rectifying and smoothing unit to output a first voltage to be supplied to a load;

TABLE 2

| ACDET Voltage [V] | Vac Voltage [V] | (Vdc Voltage [V]) | Shift Option State | Vac*(Vdc*) |
|---|---|---|---|---|
| 0.4 or more | 30 or more | 40 or more | Turn-off State | Vac0(Vdc0) |
| 0.8 or more | 60 or more | 80 or more | Stand-by State | Vac1(Vdc1) |
| 1.4 or more | 100 or more | 140 or more | Print State | Vac2(Vdc2) | a detecting unit connected to the signal line between the first secondary winding and the second secondary winding, the detecting unit configured to detect a second voltage according to a voltage output from the rectifying and smoothing unit; and a first control unit configured to control a state of the load based on a result detected by the detecting unit.

2. The power supply apparatus according to claim 1, comprising a memory unit configured to store information in which the AC voltage or a voltage output from the rectifying and smoothing unit and a state of the load are associated with the AC voltage or the voltage, wherein the first control unit controls a state of the load based on the result detected by the detecting unit and the information stored in the memory unit.

3. The power supply apparatus according to claim 1, comprising:

a switching element connected to the primary winding;

a second control unit configured to control a switching operation of the switching element; and a feedback unit configured to feed back a voltage according to the first voltage to the second control unit.

4. The power supply apparatus according to claim 3, wherein based on the result detected by the detecting unit, the first control unit performs control to shift a state of the load to any one state among a first state in which the power supply apparatus is stopped, a second state in which the power supply apparatus is operating and the load is stopped, a third state in which power consumed by the load is greater than power in the second state, and a fourth state in which power consumed by the load is greater than power in the third state.

5. The power supply apparatus according to claim 4, wherein the first control unit:

performs control to shift a state of the load to the first state in a case where a voltage detected by the detecting unit is less than a first threshold voltage;

performs control to shift a state of the load to the second state in a case where a voltage detected by the detecting unit is greater than the first threshold voltage and less than a second threshold voltage;

performs control to shift a state of the load to the third state in a case where a voltage detected by the detecting unit is greater than the second threshold voltage and less than a third threshold voltage; and performs control to shift a state of the load to the fourth state in a case where a voltage detected by the detecting unit is greater than the third threshold voltage.

6. An image forming apparatus configured to form an image on a recording medium, the image forming apparatus having a power supply apparatus configured to supply power to the image forming apparatus, wherein the power supply apparatus comprises:

a rectifying and smoothing unit configured to rectify and smooth an AC voltage of an AC power supply;

a transformer having a primary winding, a first secondary winding and a second secondary winding connected to the first secondary winding through a signal line, the transformer configured to convert a voltage output from the rectifying and smoothing unit to output a first voltage to be supplied to a load;

a detecting unit connected to the signal line between the first secondary winding and the second secondary winding, the detecting unit configured to detect a second voltage according to a voltage output from the rectifying and smoothing unit; and a first control unit configured to control a state of the load based on a result detected by the detecting unit.

7. The image forming apparatus according to claim 6, comprising a memory unit configured to store information in which the AC voltage or a voltage output from the rectifying and smoothing unit and a state of the load are associated with the AC voltage or the voltage, wherein the first control unit controls a state of the load based on the result detected by the detecting unit and the information stored in the memory unit.

8. The image forming apparatus according to claim 6, comprising:

a switching element connected to the primary winding;

a second control unit configured to control a switching operation of the switching element; and a feedback unit configured to feed back a voltage according to the first voltage to the second control unit.

9. The image forming apparatus according to claim 8, wherein based on the result detected by the detecting unit, the first control unit performs control to shift a state of the load to any one state among a first state in which the power supply apparatus is stopped, a second state in which the power supply apparatus is operating and the load is stopped, a third state in which power consumed by the load is greater than power in the second state, and a fourth state in which power consumed by the load is greater than power in the third state.

10. The image forming apparatus according to claim 9, wherein the first control unit:

performs control to shift a state of the load to the first state in a case where a voltage detected by the detecting unit is less than a first threshold voltage;

performs control to shift a state of the load to the second state in a case where a voltage detected by the detecting unit is greater than the first threshold voltage and less than a second threshold voltage;

performs control to shift a state of the load to the third state in a case where a voltage detected by the detecting unit is greater than the second threshold voltage and less than a third threshold voltage; and performs control to shift a state of the load to the fourth state in a case where a voltage detected by the detecting unit is greater than the third threshold voltage.

11. The image forming apparatus according to claim 10, wherein the third state is a state in which the image forming apparatus stands by for input of print data, and wherein the fourth state is a state in which it is possible to perform image forming operations.

12. The image forming apparatus according to claim 9, wherein the third state is a state in which the image forming apparatus stands by for input of print data, and wherein the fourth state is a state in which image forming operations are enabled.

13. A power supply apparatus comprising:

a rectifying and smoothing unit configured to rectify and smooth an AC voltage of an AC power supply;

a transformer having a primary winding, a first secondary winding and a second secondary winding, the first secondary winding configured to convert a voltage output from the rectifying and smoothing unit to output a first voltage to be supplied to a load and the second secondary winding configured to convert the output from the rectifying and smoothing unit to output a second voltage;

a detecting unit connected to the second secondary winding, the detecting unit configured to detect the second voltage; and a first control unit configured to control a state of the load based on a result detected by the detecting unit.

14. An image forming apparatus configured to form an image on a recording medium, the image forming apparatus having a power supply apparatus configured to supply power to the image forming apparatus,
wherein the power supply apparatus comprises:
a rectifying and smoothing unit configured to rectify and smooth an AC voltage of an AC power supply;
a transformer having a primary winding, a first secondary winding and a second secondary winding, the first secondary winding configured to convert a voltage output from the rectifying and smoothing unit to output a first voltage to be supplied to a load and the second secondary winding configured to convert the output from the rectifying and smoothing unit to output a second voltage;
a detecting unit connected to the second secondary winding, the detecting unit configured to detect the second voltage; and
a first control unit configured to control a state of the load based on a result detected by the detecting unit.

\* \* \* \* \*